Dec. 24, 1957  W. L. WHITE ET AL  2,817,278
FILTER ADAPTER FOR AERIAL CAMERA STEREO CONE
Filed April 27, 1955  2 Sheets-Sheet 1

INVENTORS
WALTER L. WHITE
JACK O. HILL
BY
ATTORNEYS

Dec. 24, 1957   W. L. WHITE ET AL   2,817,278
FILTER ADAPTER FOR AERIAL CAMERA STEREO CONE
Filed April 27, 1955   2 Sheets-Sheet 2

INVENTORS
WALTER L. WHITE
JACK O. HILL
BY
ATTORNEYS

2,817,278

FILTER ADAPTER FOR AERIAL CAMERA STEREO CONE

Walter L. White and Jack O. Hill, Washington, D. C.

Application April 27, 1955, Serial No. 504,392

3 Claims. (Cl. 95—12.5)

(Granted under Title 35, U. S. Code (1952), sec. 266)

The invention described herein may be manufactured and used by or for the Government of the United States of America for governmental purposes without the payment of any royalties thereon or therefor.

The present invention relates to filters for aerial cameras. More particularly, the invention relates to apparatus for mounting a variety of filters on the lens cone of a stereoscopic aerial camera in such a manner that the filters may be adjusted, or removed and replaced without removal of the camera from the supporting structure therefor.

As is well known in the art, aerial cameras of the type mounted within the bottom of an aircraft necessitate the complete removal of the camera from the supporting structure in order to adjust or remove and replace filters of the prior art, particularly those which are fitted to the individual lenses since the prior art filters are neither visible nor accessible from within the aircraft when the camera is in operative position.

The present invention provides a supporting base which is conveniently secured to the lens supporting cone of the camera and between the lenses thereof. A pair of superimposed clear plastic discs of sufficiently large diameter, to cover both lenses of the camera and to be visible from within the aircraft with the camera in place are provided, one of the discs being fixed to the supporting base. The discs provide a protective enclosure for a light filter disc of substantially equal diameter to the clear discs, the light filter disc being preferably of the polarizing type, wherein the effective light filtration may be adjusted by rotation of the filter disc by means of a tab thereon to the desired angle as indicated by a scale on the fixed clear plastic disc. As heretofore stated such adjustment may be made without removing the camera from the support-structure therefor. If desired a pair or a plurality of pairs of angularly spaced color filters may be inserted between the clear discs in such a manner that a pair of filters may be brought into axial alignment with the lenses and in combination with the polarizing filter or the polarizing filter may be removed if conditions are such that it is not required.

An object of the present invention is to provide a filter adapter for a stereoscopic aerial camera whereby filters may be adjusted or added to the camera in a convenient manner without the necessity of removing the camera from the supporting structure therefor.

Another object is to provide a filter adapter for a stereoscopic aerial camera wherein color filters may be readily brought into effective position under the lenses of the camera without disturbing the position of the camera.

Still another object of the invention is to provide a filter for a stereoscopic aerial camera whereby a single rotatable polarizing disc controls both lenses of the camera thus eliminating complicated mechanism to ensure synchronization of the usual discs individual to each lens.

Other objects and many of the attendant advantages of this invention will be readily appreciated as the same becomes better understood by reference to the following detailed description when considered in connection with the accompanying drawings wherein.

Figure 1:
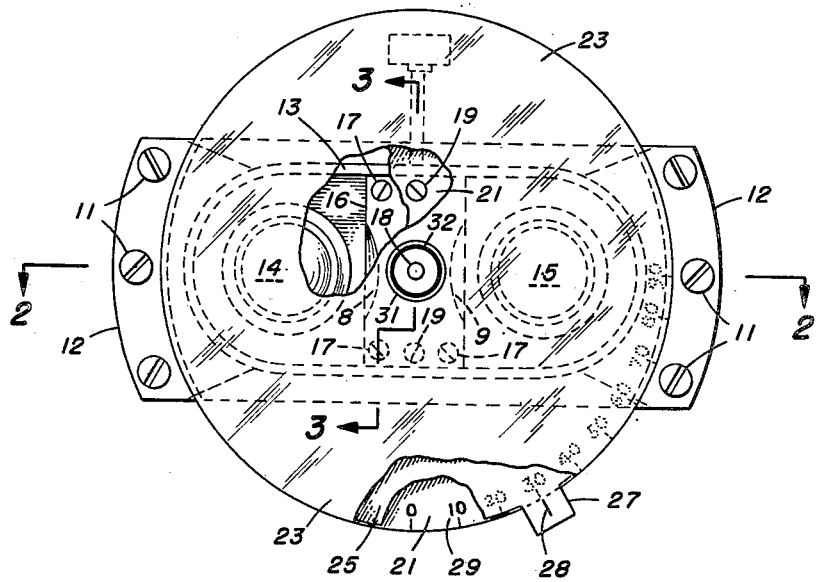
Fig. 1 is a bottom plan view of the lens cone of a stereoscopic aerial camera and showing the device of the present invention applied thereto.
Figure 2:
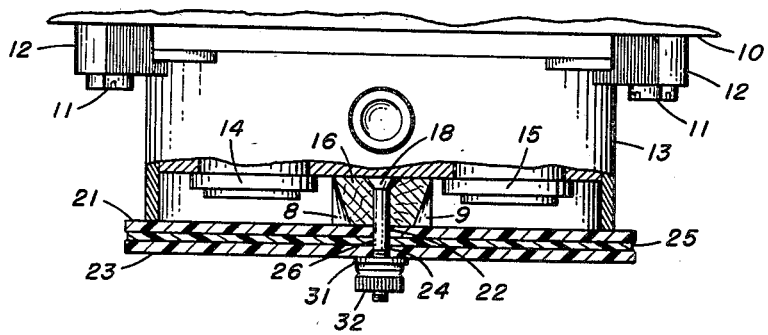
Fig. 2 is a side elevation of the apparatus of Fig. 1, parts being broken away to show the polarizing filter and the clear discs in section and the relative position of the lens mounts therewith.
Figure 3:
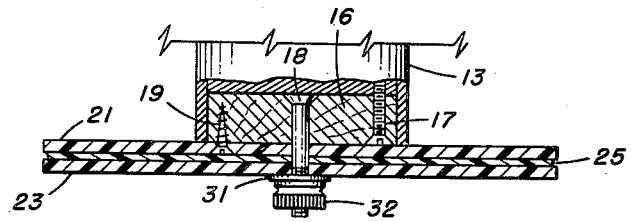
Fig. 3 is a sectional view taken along the line 3—3 of Fig. 1.

Referring more particularly to the drawings wherein like numerals indicate like parts throughout the several views, 10 indicates an aerial camera of the stereoscopic type, a portion of which is shown in Fig. 1, of the type mounted in the bottom of an aircraft for photographing views of the terrain therebelow. Camera 10 has fixed by screws 11 a pair of arcuate brackets 12. Brackets 12 support for rotative adjustment therein a lens mount or cone 13 having mounted therein a pair of spaced stereoscopically related photographic lenses 14 and 15.

A supporting base member 16 having cut-away portions 8 and 9 in order to prevent obscuring the field of view of the lenses 14 and 15 is mounted in the cone 13 between the lenses 14 and 15, the outer surface of member 16 being substantially flush with the outer edge of cone 13. Member 16 is secured in cone 13 by screws 17. A pivot bolt 18 extends through member 16 and is centered between the lenses 14 and 15. Secured fixedly to member 16 by screws 19 is a large disc 21 at least of sufficient diameter to cover both lenses 14 and 15, and formed of a transparent plastic material and having an axial bore 22 through which the bolt 18 passes. A second disc 23 of a transparent plastic material and of a diameter equal to that of disc 21 has an axial bore 24 through which bolt 18 also passes. Interposed between discs 21 and 23 is positioned a polarizing filter disc 25 of substantially the same diameter as discs 21 and 23 and having an axial bore 26 through which bolt 18 passes and a tab 27 extending radially from the periphery of the disc 25. Tab 27 is provided with a reference mark 28. Transparent discs 21 and 23 and polarizing filter disc 25 are of such diameter that they are easily visible and readily accessible from within the aircraft when the camera is in operative position.

Fixed disc 21 is provided with a scale 29 marked preferably in degrees from 0 to 90. Filter disc 25 may be rotated about the axis provided by bolt 18 to produce a variety of light filtering effects by grasping the tab 27 and moving the filter to a desired position as indicated by the position of mark 28 with respect to scale 29 on fixed disc 21, as clearly shown in Fig. 1. In order to retain discs 21, 23 and 25 in position with respect to lenses 14 and 15 a washer 31 and nut 32 are mounted on bolt 18. It is also clear that when nut 32 is tightened filter disc 25 is held against rotation, thus preventing undesired changes in filtering action thereof.

If it is desired to provide a more pronounced light filtering effect than that produced by the heretofore described structure, a pair of polarizing filters may be employed, one being rotatable with respect to the other.

It is, of course, understood that filter disc 25 may be in the form of a gelatin color filter of the same diameter, if desired, it being understood that under such condition it is not necessary to rotate the disc for adjustment. It is also conceivable that both color filters and polarizing filters may be used in combination between the transparent discs 21 and 23.

Figure 4:
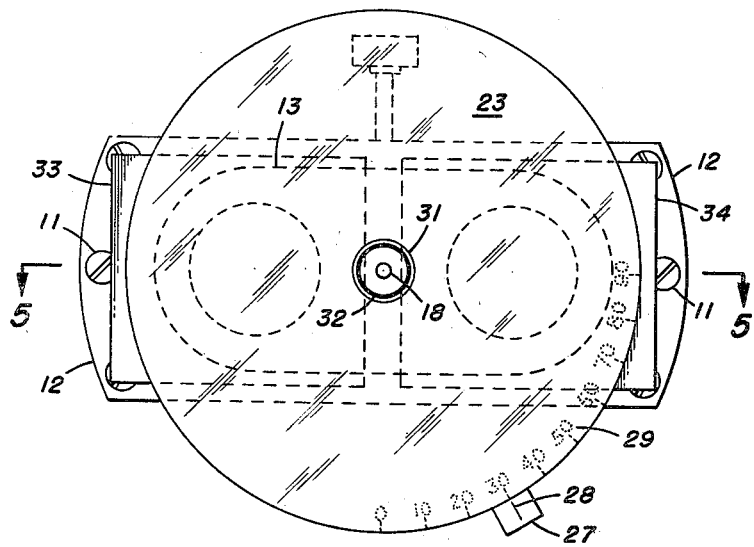
Fig. 4 is a plan view similar to Fig. 1 and showing a pair of color filters inserted between the clear discs and the polarizing filter disc and in axial alignment with the lenses of the camera.
Figure 5:
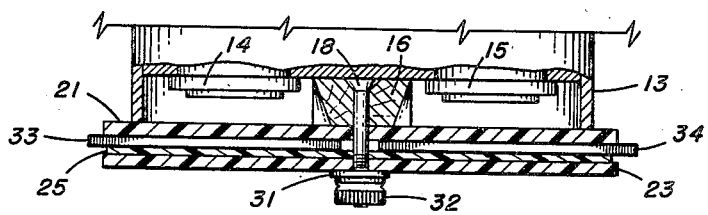
Fig. 5 is a sectional view taken along the line 5—5 of Fig. 4 and showing the filters in elevation.

In Figs. 4 and 5 are shown gelatin color filters 33 and 34 which may be inserted between transparent discs 21 and 23 either with or without the filter 25 and in alignment with the lenses 14 and 15. Discs 21 and 23 being slightly flexible, color filters 33 and 34 may be readily inserted or removed without loosening nut 32. While only a single pair of gelatin filters have been shown, as will be obvious, a plurality of pairs of different kinds of gelatin filters may be inserted between transparent disc 23 and polarizing filter disc 25 and angularly spaced about bolt 18 whereby any selected pair of gelatin filters may be brought into registration with lenses 14 and 15 by rotation of discs 23 and 25. With this arrangement, if it is desired not to use a polarizing filter, a third transparent disc may be substituted for polarizing filter disc 25.

Obviously many modifications and variations of the present invention are possible in the light of the above teachings. It is therefore to be understood that within the scope of the appended claims the invention may be practiced otherwise than as specifically described.

What is claimed is:

1. In combination: an aerial camera having a pair of spaced stereoscopically related lenses mounted within a lens cone; and a filter adapter for said camera comprising, a base member secured to said camera between said lenses in said lens cone, a first protective disc of transparent material fixed against rotation to said base member, a second protective disc of transparent material rotatively mounted on said base member and superimposed with respect to said first disc in axial alignment therewith, a polarizing disc means comprising at least one polarizing disc interposed between said first and second discs and rotatively mounted on said base member in axial alignment with said first and second discs, said first and second discs and said one polarizing disc being of at least sufficient diameter to cover simultaneously both of said lenses and to be easily visible and readily accessible from within an aircraft when said camera is in operative position, a tab on the periphery of said one polarizing disc and having a reference mark thereon, and a scale inscribed on said first protective disc and adapted to be read in conjunction with said reference mark as said one polarizing disc is rotated for adjustment, said discs being open edged whereby access may be had to the spaces therebetween when the discs are assembled on said camera, at least a pair of color filters interposed between said first and second protective discs and respectively alignable with said lenses, and means to lock said discs and said color filters in an adjusted position.

2. In combination: an aerial camera of the stereoscopic type having a pair of spaced stereoscopically related photographic lenses mounted in a lens cone, and a filter adapter for said camera comprising, a base member secured to said camera between said lenses in said lens cone, a first protective disc of transparent material mounted fixedly on said base member, a second protective disc of transparent material supported on said base member and superimposed on said first disc in axial alignment therewith, said discs being of a diameter at least sufficient to simultaneously cover both of said lenses and to be easily visible and readily accessible from within an aircraft when the camera is in operative position, means for drawing said discs into close face adjacency, said discs being open edged whereby access may be had to the spaces therebetween when the discs are assembled on said camera, and at least a pair of color filters adapted to be inserted between said discs in diametrically opposed relation and respectively alignable with said lenses.

3. In combination: an aerial camera having a pair of stereoscopically related lenses mounted within a lens cone; and a filter adapter for said camera comprising, a base member secured to said camera between said lenses, a first protective disc of transparent material fixed against rotation to said base member, a second protective disc of transparent material rotatably mounted on said base member and superimposed upon said first disc in axial alignment therewith, first and second polarizing discs interposed between said first and second disc in axial alignment therewith, said first and second protective discs and said first and second polarizing discs each having a diameter at least sufficient to cover simultaneously both of said lenses and to be easily visible and readily accessible from within an aircraft when said camera is in operative position, at least one of said polarizing discs being rotatably mounted, a tab on the periphery of said one polarizing disc having a reference mark thereon, a scale inscribed on said first protective disc adapted to be read in conjunction with said reference mark as said one polarizing disc is rotated, said discs being open edged whereby access may be easily had to the spaces therebetween when the discs are assembled on said camera, at least a pair of color filters interposed between said first and second protective discs and respectively alignable with said lenses, and means to lock said discs and said color filters in an adjusted position.

References Cited in the file of this patent

UNITED STATES PATENTS

| | | |
|---|---|---|
| 2,142,657 | Sauer et al. | Jan. 3, 1939 |
| 2,152,513 | West | Mar. 28, 1939 |
| 2,170,959 | Bartels et al. | Aug. 29, 1939 |
| 2,369,483 | Musebeck | Feb. 13, 1945 |
| 2,377,313 | Casier | June 5, 1945 |
| 2,482,571 | Arnold | Sept. 20, 1949 |
| 2,526,889 | McComb | Oct. 24, 1950 |
| 2,688,900 | Silverman | Sept. 14, 1954 |
| 2,695,553 | Tate | Nov. 30, 1954 |
| 2,747,076 | Eloranta | May 22, 1956 |

FOREIGN PATENTS

| | | |
|---|---|---|
| 503,901 | Great Britain | Apr. 17, 1939 |